US012796654B2

(12) United States Patent
Abdow et al.

(10) Patent No.: US 12,796,654 B2
(45) Date of Patent: Nov. 17, 2026

(54) FOOD PELLET DISPENSER

(71) Applicant: MED Associates, Inc., Fairfax, VT (US)

(72) Inventors: James Abdow, Raleigh, NC (US); Connor Harrigan, Burlington, VT (US); Richard Wheeler, Winooski, VT (US); Keith Epstein, South Burlington, VT (US); Christopher Johnson, Williston, VT (US); Zachary Beebe, Burlington, VT (US)

(73) Assignee: MED Associates, Inc., Fairfax, VT (US)

( * ) Notice: Subject to any disclaimer, the term of this patent is extended or adjusted under 35 U.S.C. 154(b) by 160 days.

(21) Appl. No.: 18/821,102

(22) Filed: Aug. 30, 2024

(65) Prior Publication Data

US 2026/0060207 A1 Mar. 5, 2026

(51) Int. Cl.
*A01K 5/02* (2006.01)

(52) U.S. Cl.
CPC .......... *A01K 5/0275* (2013.01); *A01K 5/0291* (2013.01)

(58) Field of Classification Search
CPC .. A01K 5/0275; A01K 5/0291; A01K 5/0225; B65G 65/489; B65G 65/4881; B65G 65/4809; B65G 65/4818; B65G 65/4827; B65G 65/40; B65G 65/44; B65G 65/48; B28C 7/067
USPC ............ 193/33, 34; 222/552, 548, 553, 555; 221/177, 179, 180, 182
See application file for complete search history.

(56) References Cited

U.S. PATENT DOCUMENTS 4,296,695 A * 10/1981 Quanbeck .............. A01C 15/04 111/178
11,034,527 B2 * 6/2021 Hoshi .................. B65G 47/145

* cited by examiner

*Primary Examiner* — David J Walczak
(74) *Attorney, Agent, or Firm* — Downs Rachlin Martin PLLC

(57) ABSTRACT

A pellet dispenser system reliably dispenses a pellet when appropriate and is easy to clean. The system includes a hopper having two chambers separated by a divider with a pellet passageway. A dispensing hole allows single pellets to pass into a pellet chute when a disc having one or more pellet holes is rotated by a motor. When a pellet is to be dispensed, such as when a lever is pressed, the disc is rotated within the hopper and carries a pellet in one of the pellet holes until the pellet hole reaches the dispensing hole, at which point the pellet passes through the dispensing hole and into the pellet chute. A beam may be directed through the pellet chute such that the beam is interrupted when a pellet passes through the pellet chute, allowing for verification that a pellet was dispensed.

10 Claims, 13 Drawing Sheets

FOOD PELLET DISPENSER

FIELD

The present disclosure generally relates to dispensers. In particular, the present disclosure is for a food pellet dispenser.

BACKGROUND

Pellet or granule feed dispensers are used to allocate feed in a controlled manner. Such dispensers are often automated and dispense an amount of food, such as a single pellet, in response to an input signal. In research, for example, these dispensers are used as part of a reward-delivery system that dispenses a pellet to an animal when a task, such as pressing a lever, is performed. Current dispensers can be difficult to clean, tend to become jammed, can cause damage to granules or pellets during delivery, and have unreliable techniques for confirming a pellet was dispensed in response to input.

SUMMARY

A pellet dispenser system includes a hopper having an upper chamber and a lower chamber, wherein the upper chamber is separated from the lower chamber by a divider, wherein the upper chamber includes an outer wall portion opposite the divider, wherein the lower chamber includes a pellet dispensing hole in an upper portion of a bracket facing wall opposite the divider, and wherein the divider includes a passageway at a bottom of the divider. A disc within the lower chamber has one or more pellet holes, wherein each of the one or more pellet holes is sized and configured to contain a pellet, and a motor connected to the disc such that, upon activation, the motor rotates the disc such that the one or more pellet holes rotate from a lower portion of the lower chamber to being aligned with the pellet dispensing hole.

In another embodiment, a feeder system for dispensing pellets has a hopper having an upper chamber and a lower chamber, wherein the upper chamber is separated from the lower chamber by a divider, wherein the upper chamber includes an outer wall portion opposite the divider, wherein the lower chamber includes a pellet dispensing hole in an upper portion of a bracket facing wall opposite the divider, and wherein the divider includes a pellet passageway at a bottom of the divider. A bracket for mounting the hopper has a bracket mount and a housing, wherein the hopper is attached to the housing and wherein a pellet chute is connected at a first end to the pellet dispensing hole and passes through the housing, wherein the bracket is configured to support the hopper such that, when the bracket is mounted the outer wall portion is substantially vertical and the bracket facing wall is at about a 45 degree angle.

A method of dispensing pellets includes placing a plurality of pellets in a hopper, wherein the hopper includes an upper chamber and a lower chamber, and wherein placing the plurality of pellets includes placing the plurality of pellets in the upper chamber which causes a subset of the plurality of pellets to move into the lower chamber through a passageway in a divider between the upper chamber and the lower chamber, receiving a request for a pellet, rotating a disc within the lower chamber, the disc including a pellet hole, such that a one of the subset of the plurality of pellets is carried in the pellet hole to a dispensing hole in the lower chamber, causing the pellet to fall into a chute, and detecting whether an IR beam directed across the chute is interrupted.

In addition, the method may include sending a signal to stop rotating the disc when the IR beam is interrupted, sending, if the IR beam is not interrupted within a first time period since the request was received, a signal to rotate the disc back and forth for a second time period and then resending the signal to rotate the disc, and sending an alert if the IR beam is not interrupted within a third time period after the second time period.

In addition, the method may include incrementing a request number upon receiving the request and decrementing the request number when the IR beam is interrupted.

In another aspect, a disc is sized and configured to be received in a pellet dispenser and includes a circular surface having a plurality of holes, wherein each of the plurality holes passes through the disc and is sized to receive a food pellet of a certain size, wherein each of the plurality of holes includes an indentation around the hole, wherein each of the plurality of holes is tapered such that the hole is narrower at a top surface of the disc and wider at a bottom surface of the disc. In certain embodiments, each of the plurality of holes may be tapered at about 4 degrees, the disc includes a chamfered edge, the disc has a spacer attached to a center of the top surface and extending upward from the top surface of the disc, and/or the food pellet size is 20 mg or 45 mg.

BRIEF DESCRIPTION OF THE DRAWINGS

For the purpose of illustration, the accompanying drawings show aspects of one or more embodiments of the disclosure. However, it should be understood that the scope of this disclosure is/are not limited to the precise arrangements and instrumentalities shown in the drawings, wherein.

DETAILED DESCRIPTION

Figure 1:
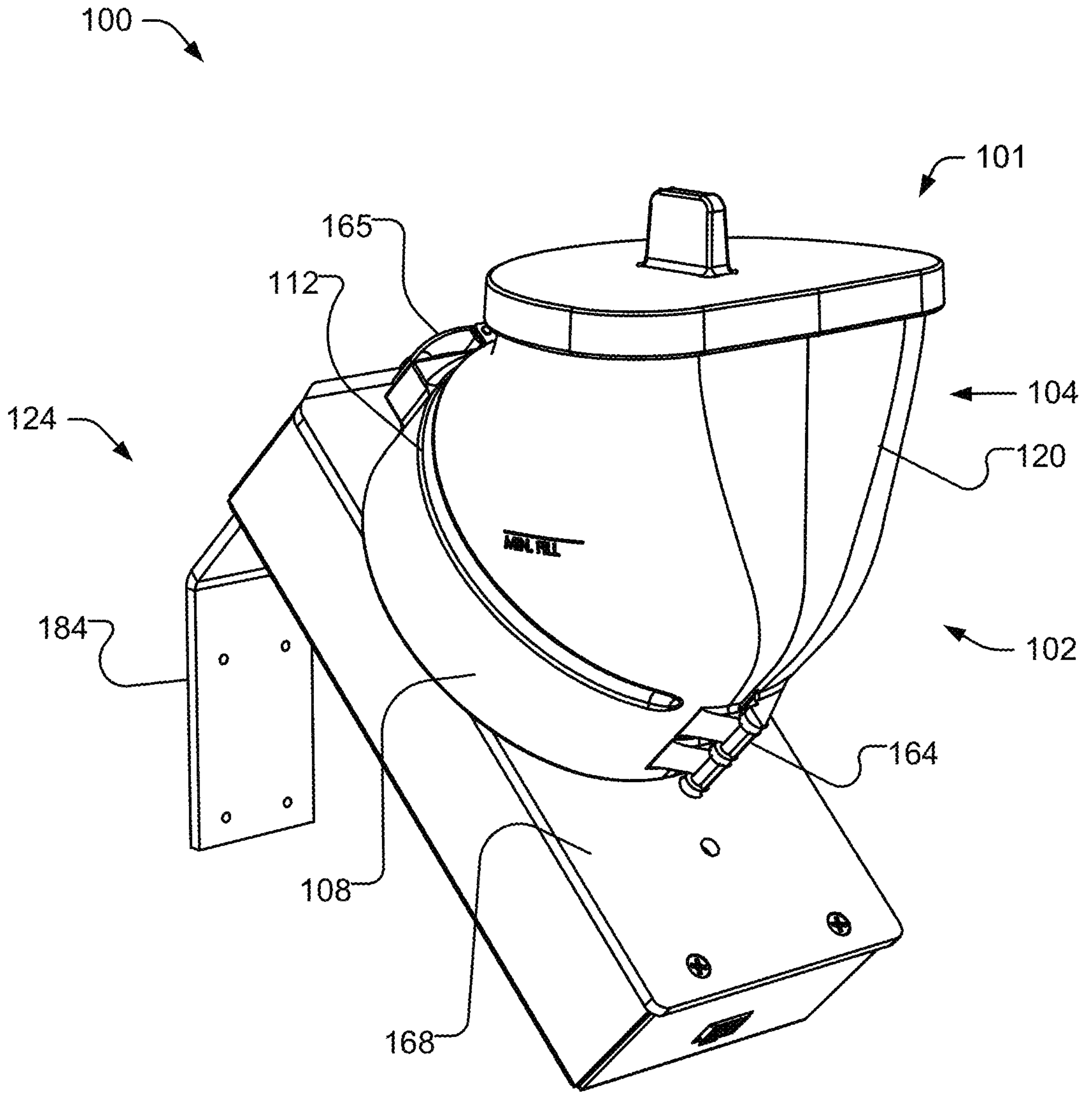
FIG. 1 is a rear perspective view of a food pellet dispenser attached to a bracket in accordance with an embodiment of the present disclosure.
Figure 2:
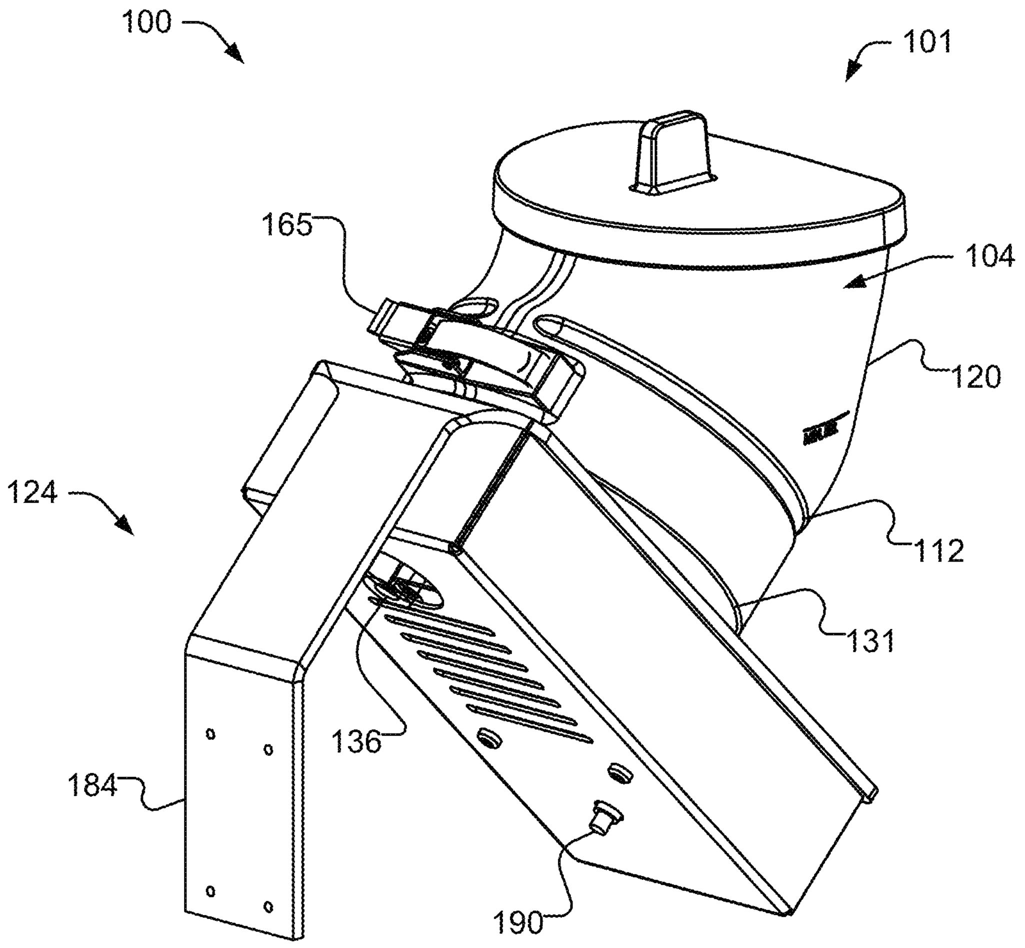
FIG. 2 is a front perspective view of the food pellet dispenser attached to the bracket.
Figure 3A:
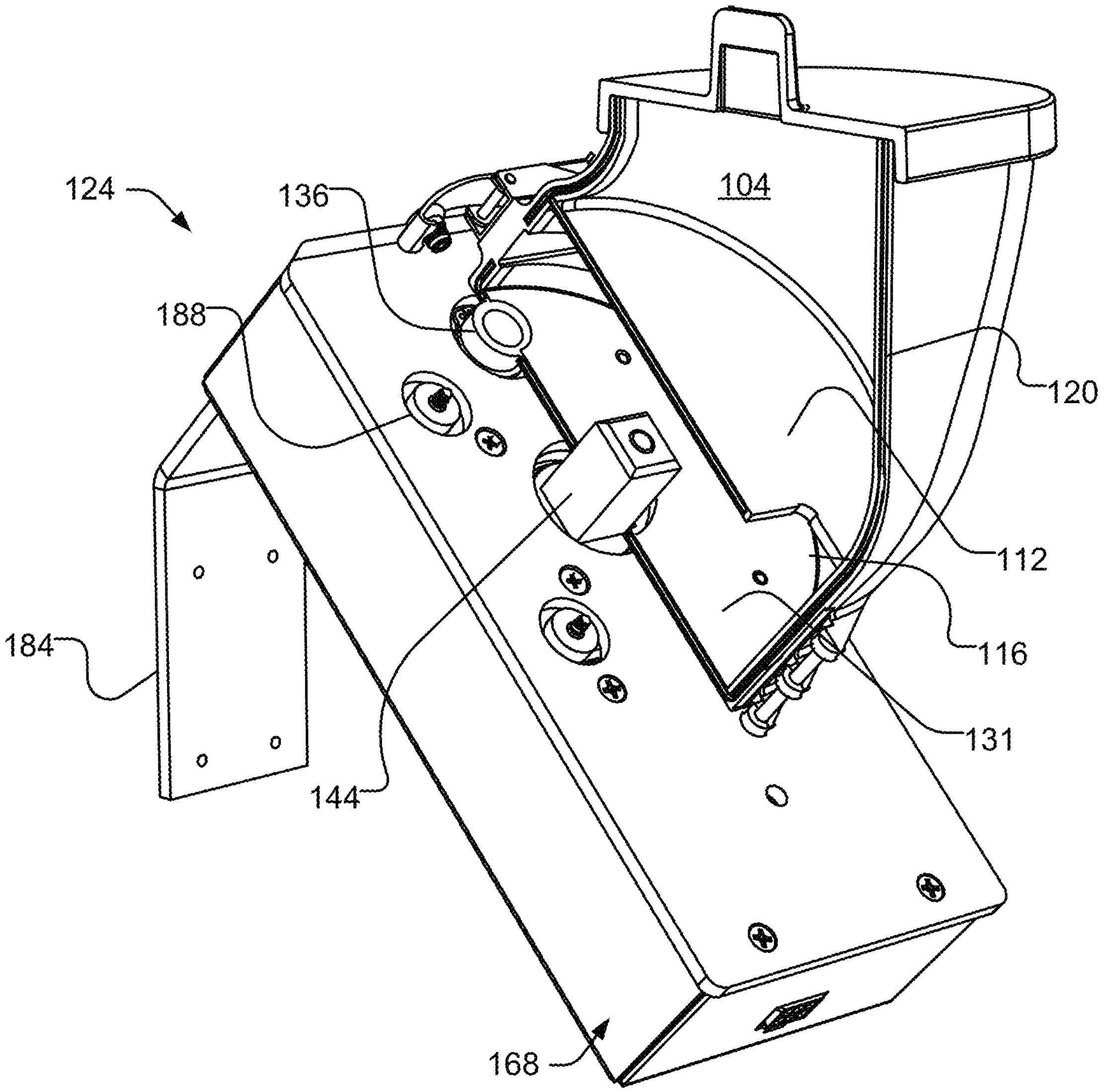
FIG. 3A is a partial cutaway perspective view of the food pellet dispenser attached to the bracket in which a portion of the hopper is cutaway.
Figure 3B:
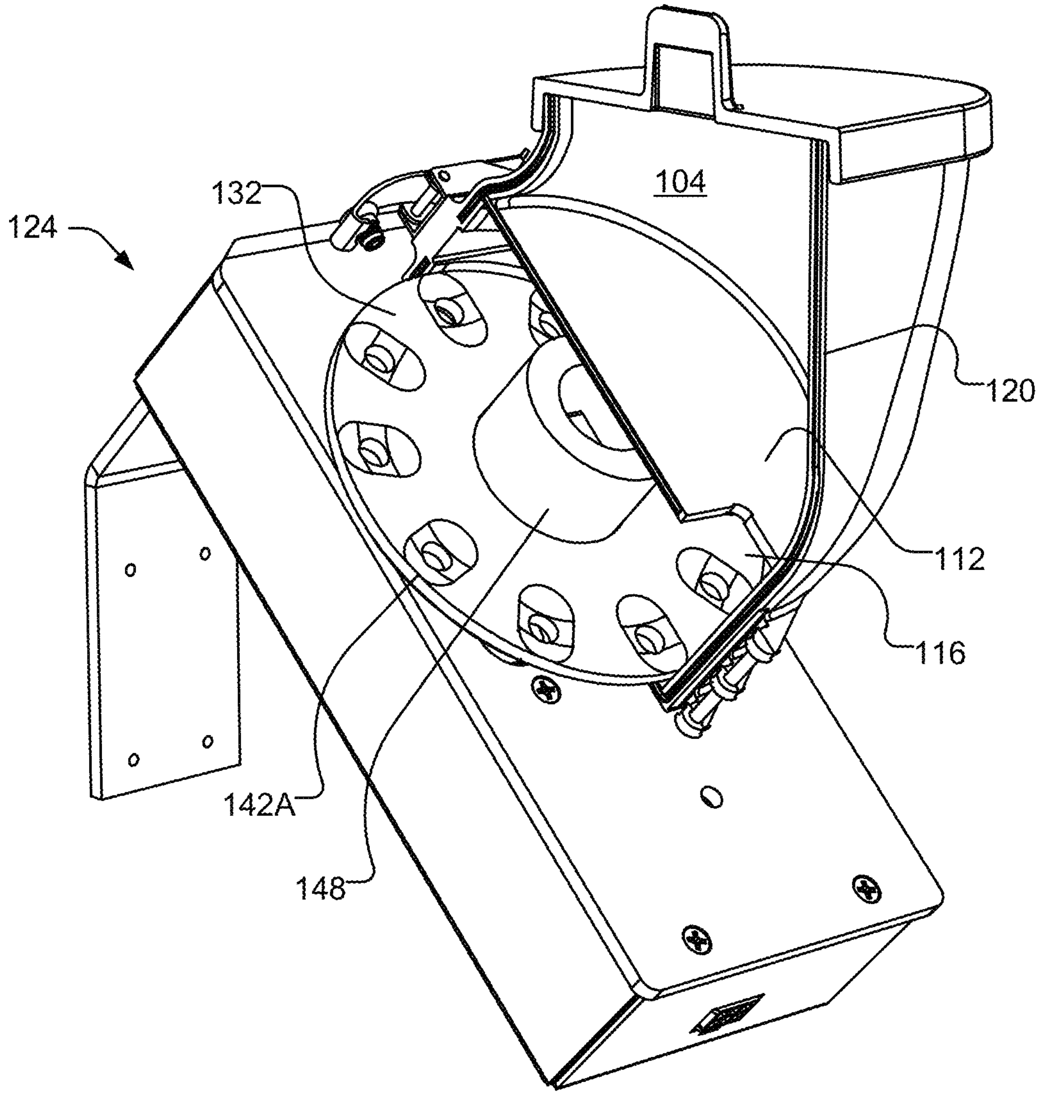
FIG. 3B is the partial cutaway perspective view of FIG. 3A in which a disc is attached to the motor adapter.
Figure 4A:
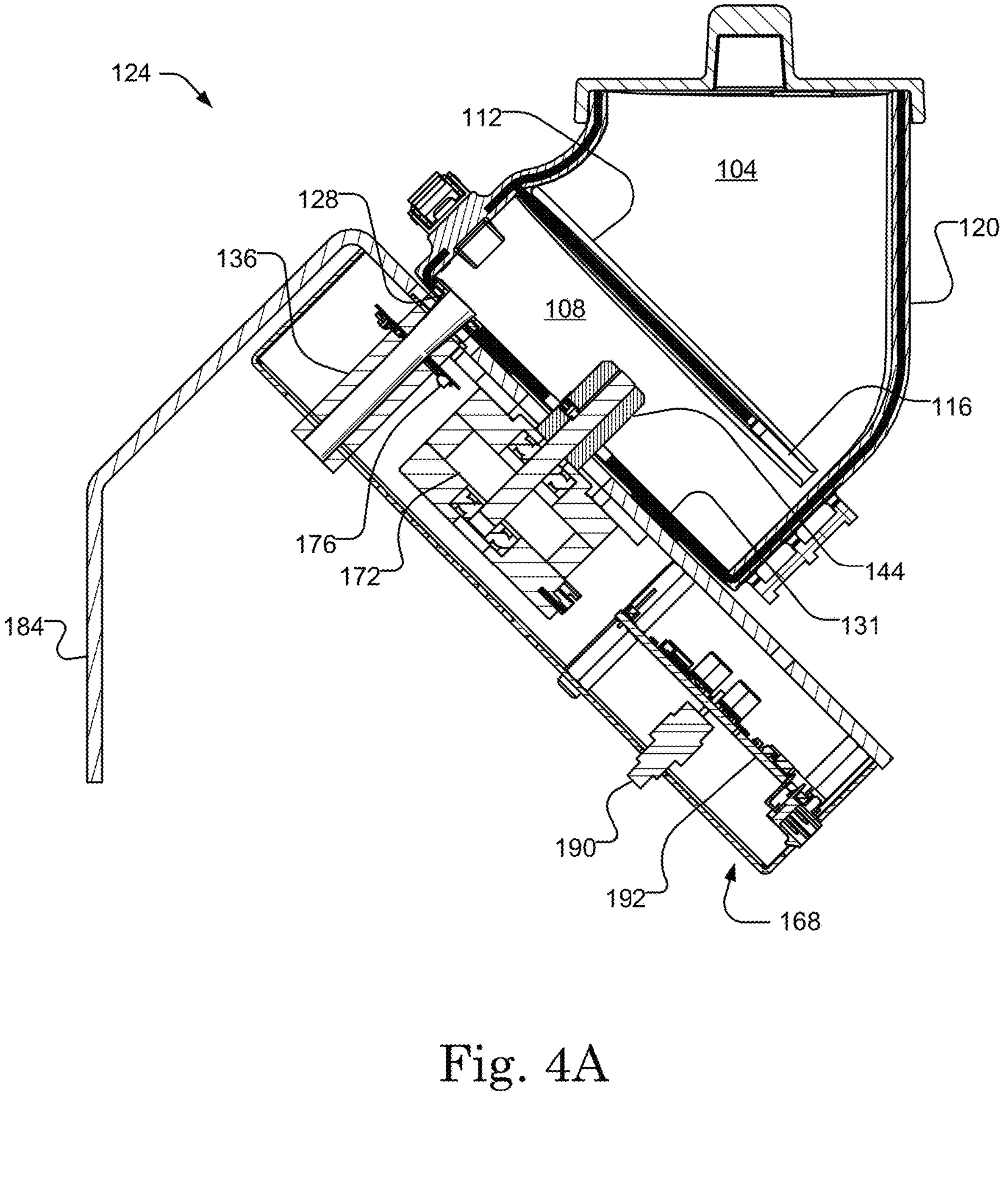
FIG. 4A is a section view of the food pellet dispenser attached to the bracket.
Figure 4B:
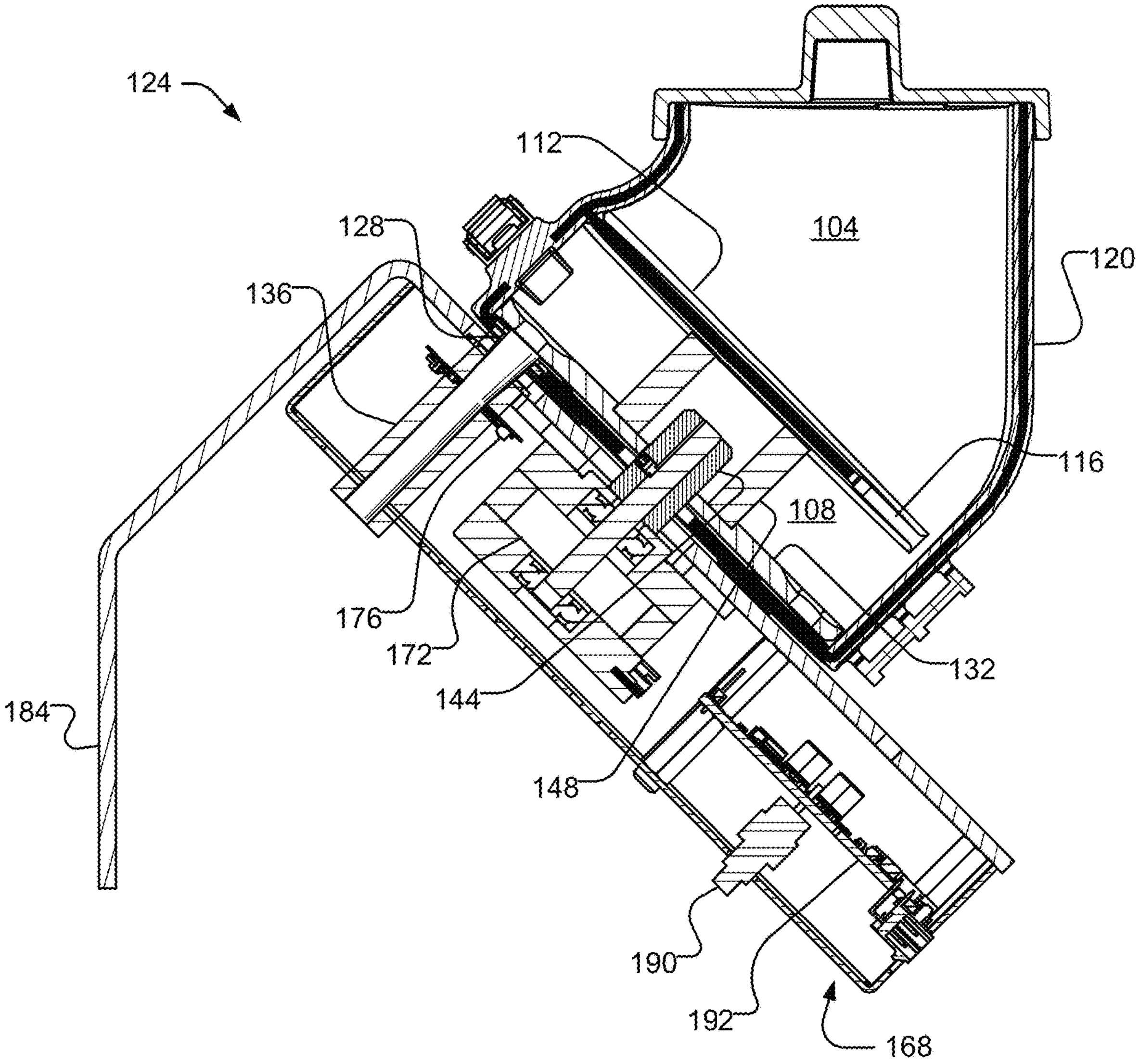
FIG. 4B is the section view of FIG. 4A in which a disc is attached to the motor adapter.
Figure 4C:
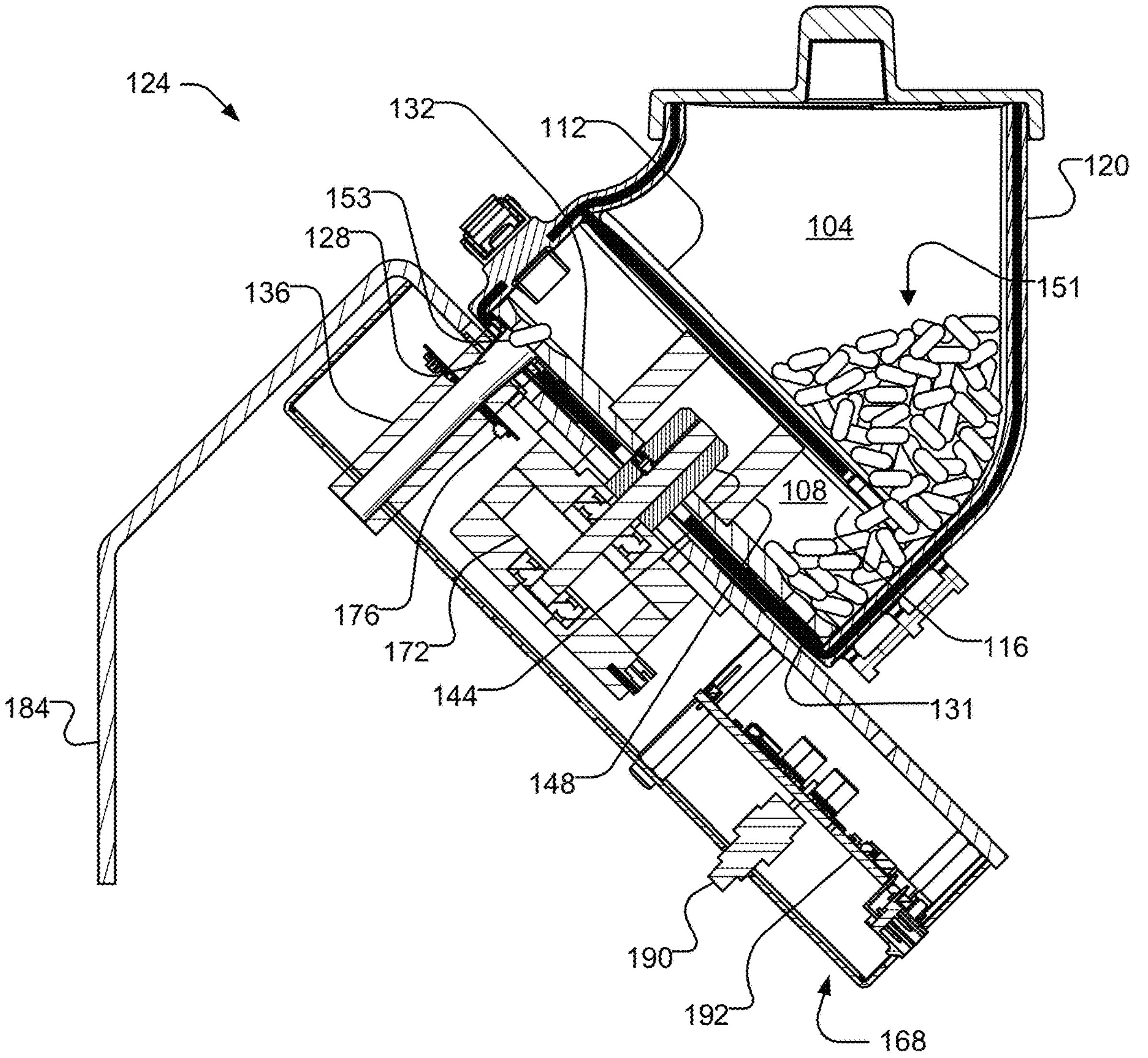
FIG. 4C is the section view of FIG. 4A with pellets in the hopper.
Figure 5:
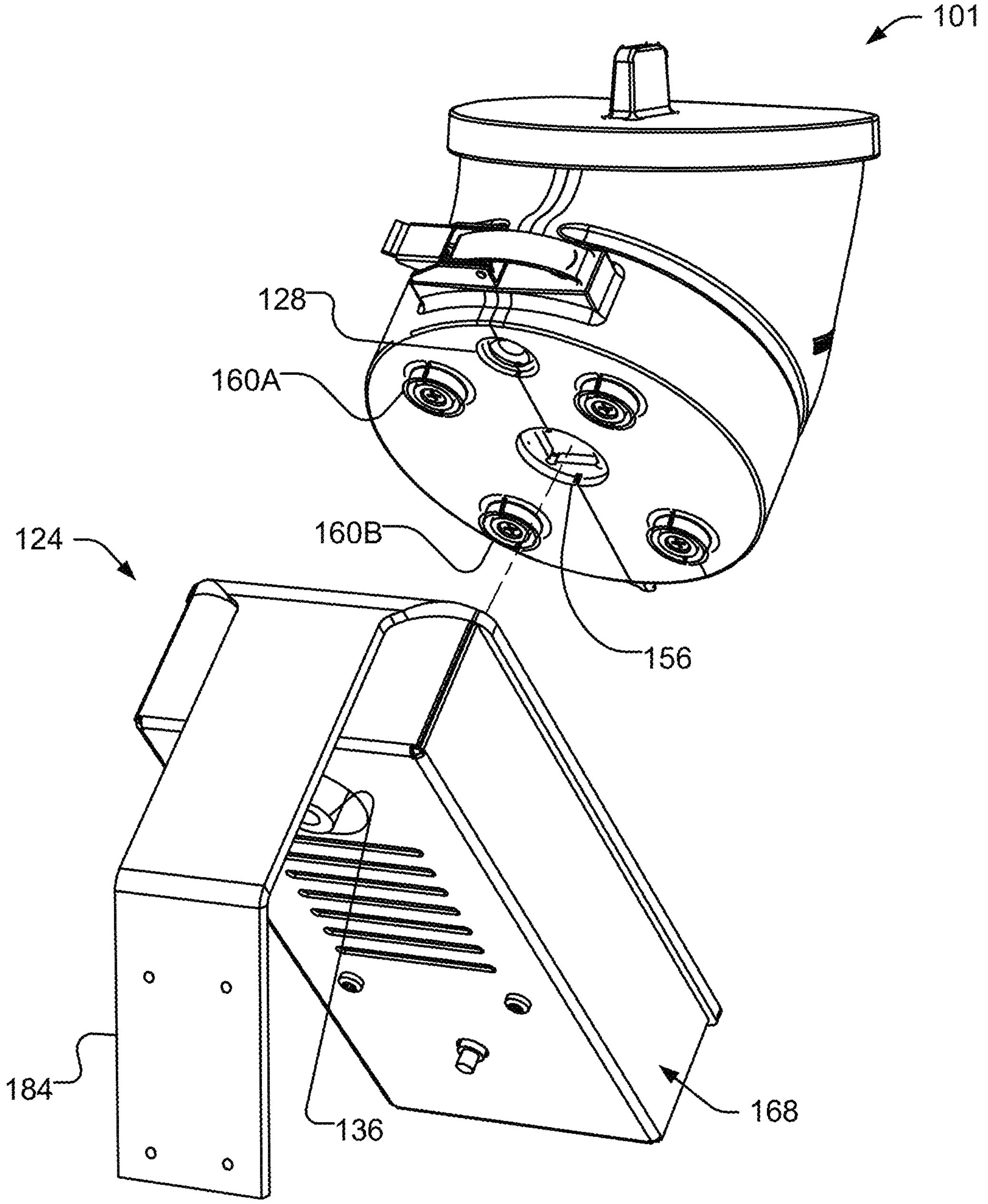
FIG. 5 is a perspective view showing the hopper detached from the bracket.
Figure 6:
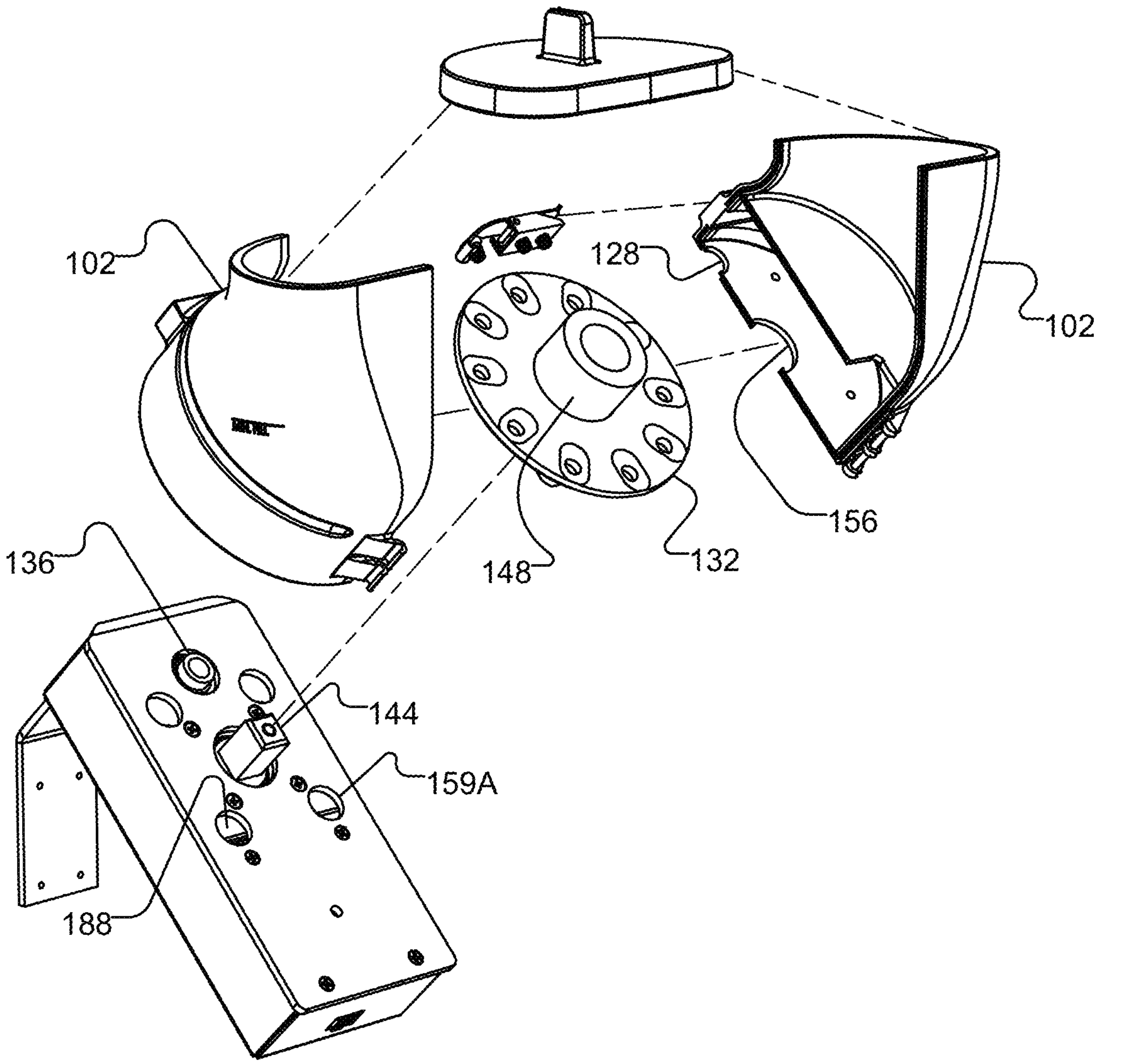
FIG. 6 is an exploded view in which two halves of the hopper are separated in accordance with an embodiment of the present disclosure.
Figure 7:
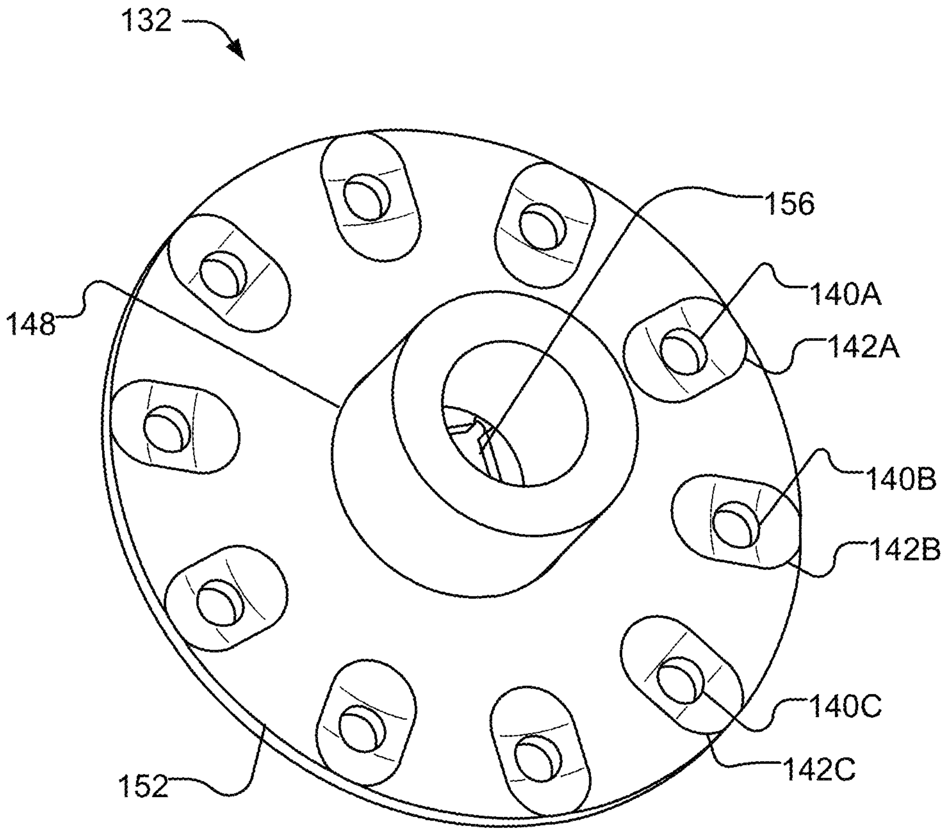
FIG. 7 is a perspective view of a disc for the pellet dispenser.
Figure 8:
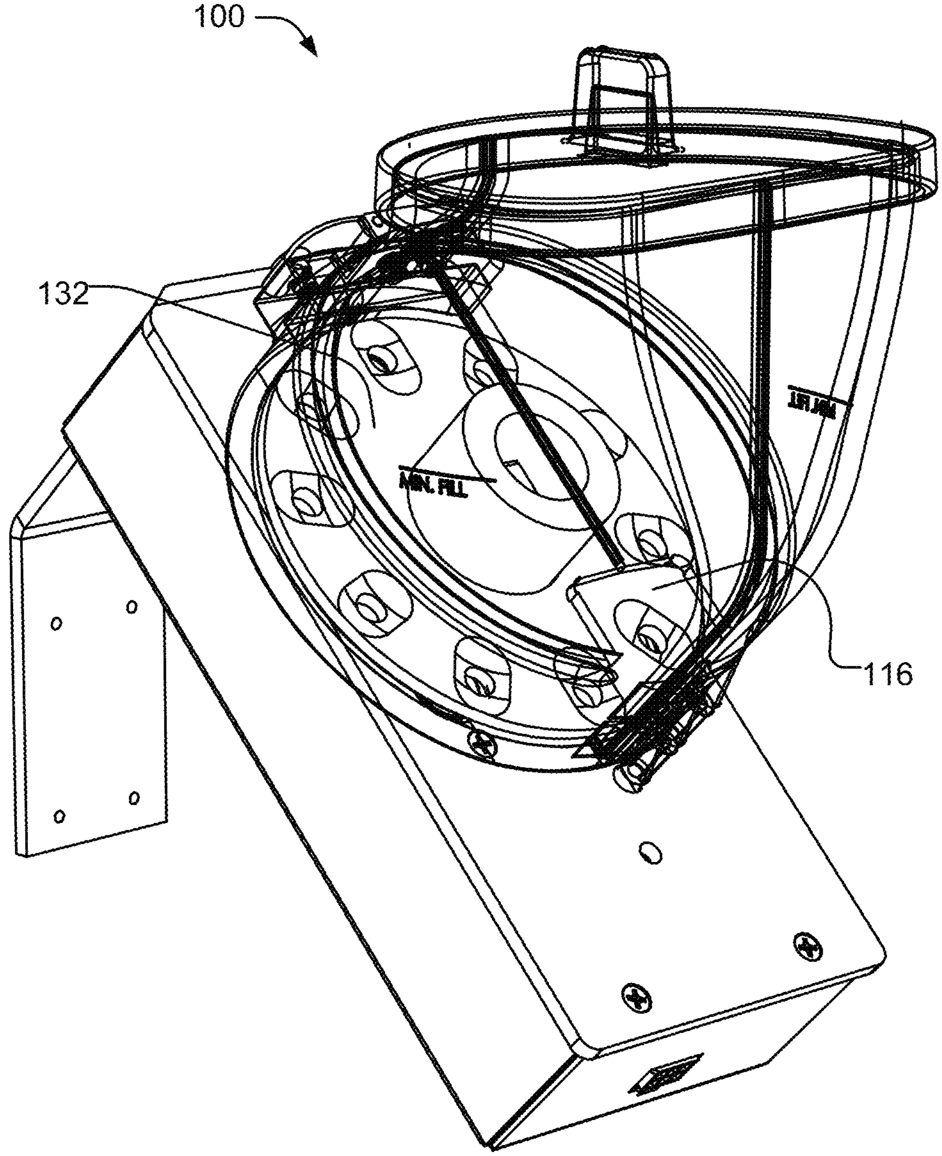
FIG. 8 is a perspective view of the food pellet dispenser attached to the bracket in which the hopper is transparent.

In an embodiment of the current disclosure, a pellet dispenser system is provided that reliably dispenses a pellet when appropriate and is easy to clean. The system includes pellet dispenser with a hopper having two chambers separated by a divider with a pellet passageway. A dispensing hole allows single pellets to pass into a pellet chute when a disc having one or more pellet holes is rotated by a motor. When a pellet is to be dispensed, such as when a lever is pressed, the disc is rotated within the hopper and carries a pellet in one of the pellet holes until the pellet hole reaches the dispensing hole, at which point the pellet passes through the dispensing hole and into the pellet chute. In addition, a sensor may be used in which a beam is directed through the pellet chute such that the beam is interrupted when a pellet passes through the pellet chute, allowing for verification that a pellet was dispensed. If no pellet is detected, the disc will be rotated until the next pellet hole of the disc reaches the dispensing hole, which continues until a pellet is detected by the sensor or a certain time period has elapsed. If the time period elapses without the detection of a pellet being dispensed, the disc will be rotated back and forth and then resume dispensing mode. If a pellet is still not detected, an alert or refill message will be provided.

A bracket supports the pellet dispenser and holds the pellet dispenser at an appropriate angle for improved pellet flow from one chamber of the hopper to the other as explained in more detail below. The bracket may be attached to or otherwise allow the pellet chute to be connected with the area where the pellets are to be dispensed, such as a rodent cage. The pellet dispenser is easily detachable from the bracket.

An exemplary pellet dispenser system, such as pellet dispenser system 100 shown in FIGS. 1-7, includes a pellet dispenser 101 with a hopper 102 having an upper chamber 104 (holding chamber) and a lower chamber 108 (dispensing chamber) separated by a chamber divider 112. The two chamber system allows for a larger number of pellets to be stored in the hopper, while reducing the weight on the dispensing disc, which reduces the torque required from the motor to rotate the disc, and prevents multiple pellets from being dispensed at once. The chamber divider 112 includes a pellet passageway 116 (as can best be seen in FIG. 3B) that allows pellets 151 to pass from upper chamber 104 to lower chamber 108 (as can be seen in FIG. 4C). (Pellets are often spherical, but may also be cylindrical or other shape.) Pellet passageway 116 is preferably positioned at the lower edge of chamber divider 112 and is sized such that it limits the number of pellets allowed into the lower chamber 108 at a given time while still maintaining enough open space to allow pellets to move freely, without breaking, grinding, or jamming. The size may be determined in part by the size of pellets to be dispensed, such as 20 mg and 45 mg spherical pellets, which are common pellet sizes used in experiments with mice and rats.

The upper chamber 104 includes a back wall 120 that is in a preferred embodiment substantially vertical when pellet dispenser 101 is mounted on a bracket 124 for use. This configuration tends to reduce occurrences of pellets forming an arch or other jamming structure over the pellet passageway 116 and not allowing pellets to pass from the upper chamber 104 to the lower chamber 108.

A dispensing hole 128 is located on an upper portion of bracket facing wall 131 of lower chamber 108, i.e., the opposite end and side of the lower chamber 108 from the pellet passageway 116. Dispensing hole 128 provides for the passage of pellets carried on disc 132 to drop into pellet chute 136. Preferably, bracket facing wall 131 is at about a 45 degree angle when pellet dispenser 101 is mounted on bracket 124. In this way, excess pellets on disc 132 that are not held in pellet hole 140 (e.g., 140A-140C) drop away as pellet hole 140 moves toward dispensing hole 128.

Disc 132 is removably placed inside the lower chamber 108 of the hopper and couples to motor, which is preferably a stepper motor, by sliding it onto the stepper motor adapter 144. The disc 132 may be made from any suitable material, including preferably acetal, a low-friction material with high resistance to wear. When activated, the motor rotates the disc 132 within the lower chamber 108, and is designed and configured, as described more below, to carry pellets from the lower portion of lower chamber 108 beneath the pellet passageway 116 to the upper portion of lower chamber 108 to dispensing hole 128 (pellet 153 is shown dropping through dispensing hole 128 in FIG. 4C).

Disc 132 includes a spacer 148 that positions the disc 132 inside the lower chamber 108, while still allowing the disc 132 to turn freely. The spacer 148 extends from the disc surface to just below the chamber divider 112 when the disc 132 is in lower chamber 108 in order to keep the disc surface flat against bracket facing wall 131 so that pellets do not slide under the disc 132.

Disc 132 also includes one or more pellet pockets 142 (e.g., 142A-142C) shaped to help guide pellets into the pellet holes 140. The pockets 142 provide a gradual transition to gently guide the pellets into place. The pellet pockets 142 additionally serve to mix the pellets in the lower chamber 108 as disc 132 rotates, helping to reduce the chance of pellets forming a jam at pellet passageway 116.

As noted, pellet hole 140 is designed to hold the pellet on the disc as it rotates until being dispensed at the dispensing hole 128 near the top of the lower chamber 108. Pellet hole 140 is preferably reverse tapered to 4 degrees, with the narrower opening at the top surface of the disc 132. Tapering helps ensure that only one pellet can sit in the hole, while the larger opening on the bottom surface of the disc 132 encourages the pellet to be released at the time of dispense, i.e., when pellet hole 140 is aligned with dispensing hole 128.

Disc 132 may also include a chamfered edge 152 to provide extra clearance between the bottom edge of the lower chamber 108, and the bottom edge of the disc 132. This clearance allows space for dust and small fragments of pellets to collect, without binding up the disc, which could prevent or inhibit rotation.

The interface 156 between the motor and the disc 132 allows for changing discs. Different discs will be designed for different sizes and/or shapes of pellets, in particular, the pellets holes and pellet pockets may be designed for different types of pellets.

Pellet dispenser 101 may also include magnet bosses 160 (e.g., 160A, 160B) that provide for insertion of countersunk magnets, such as neodymium magnets, that can be used for easy attachment and removal of the hopper 102 to the bracket 124. This positions the hopper 102 in the correct position on the bracket 124, and allows for easy removal for cleaning purposes.

A hinge 164, which may be located at the back of the hopper 102, is preferably included and allows for the hopper to be opened into two halves for easier cleaning of the inside of hopper 102 while ensuring dust and pellet fragments remain contained in the hopper 102 when secured shut. A clasp 165 or other release mechanism can be included on the hopper to facilitate opening the hopper into two halves.

The pellet dispenser 101 is attached to bracket 124, preferably at an angle such that the hopper 102 is oriented in a way that optimizes pellet delivery. That is, bracket 124 is designed to hold hopper 102 such that back wall 120 is substantially vertical and bracket facing wall 131 is at about 45 degrees. Bracket 124 may also include or be attached to a housing 168 through which pellet chute 136 runs and in which motor 172, an IR sensor 176, and a circuit board 192 are housed. A dispense activation button 190 may also be on or extend from housing 168 to allow for testing pellet dispensing.

Motor 172 is preferably a stepper motor and is connected to a stepper motor adapter 144 that attaches to the shaft of the stepper motor with a setscrew. The hopper 102 goes over and disc 132 slides onto the adapter 144 to couple the motor 172 with the disc 132, preferably via a motor adapter receiver within spacer 148. This allows the stepper motor to directly translate rotation to the disc, while still allowing a removable, modular system.

The pellet chute 136 is preferably a clear, polycarbonate tube with a tapered end nearest the hopper 102 and dispensing hole 128. This taper allows for a larger tolerance to collect the pellet dropping out of the hopper, and then funnels the pellet into a narrower section for detection by the IR sensor 176.

Bracket 124 also includes a bracket mount 184 configured to be mounted on various chamber of all sizes and configurations. The bracket can be mounted on any modular panel, or placed next to the chamber on a pedestal mount.

Bracket 124 my also include a plate 188, such as a steel plate, to allow the pellet dispenser 101 to attach to the bracket using only magnets, allowing a quick, easy removal of the hopper 102 for cleaning, filling, or other adjustments. The steel plate 188 is preferably just behind the housing 168, which may be aluminum, and may be in one or more pieces positioned below receptacles 159 (e.g., 159A) for receiving corresponding bosses 160.

In operation, pellets, typically variations of grain or sucrose pellets, are loaded into the upper chamber 104 of the hopper 102. When a pulse is received indicating that a pellet has been requested, the disc 132 in the lower chamber 108 begins to rotate. This rotation helps to guide pellets into pockets 142/holes 140 located in the disc 132, and carries the pellets upwards towards the dispensing hole 128. Once the pellet reaches the dispensing hole 128 and falls into chute 136 and through the IR beam, the disc stops rotating.

The IR sensor 176 is used to verify that a pellet was delivered when requested. The IR sensor 176 is positioned proximate the pellet chute 136 and is configured to transmit a beam across the diameter of the chute. When a pellet passes into the chute and breaks the beam, the dispensing of the pellet is detected.

Figure 9:
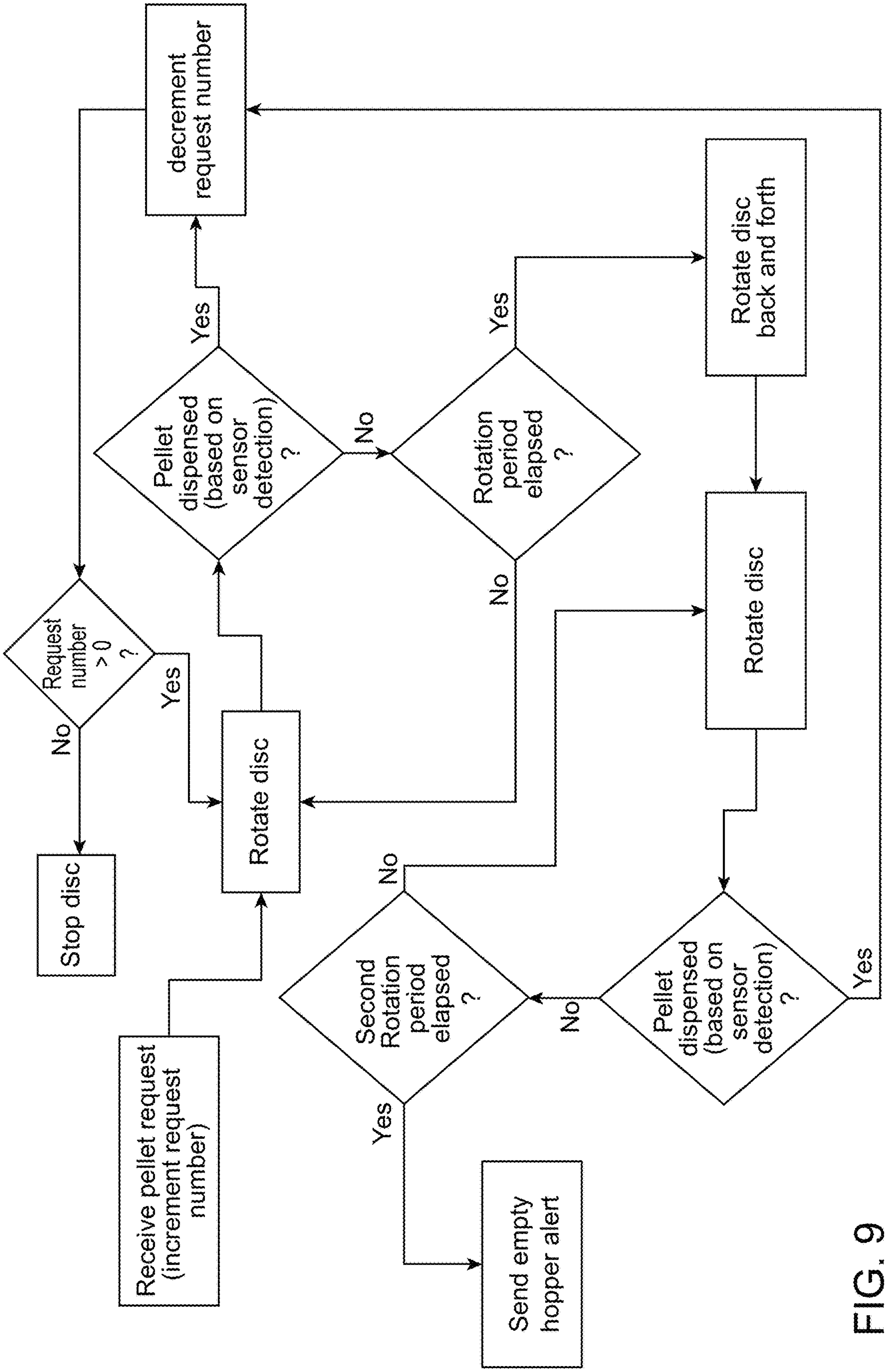
FIG. 9 is a process diagram for dispensing pellets in accordance with an aspect of the present disclosure.

FIG. 9 is a process diagram for dispensing pellets based on whether a successful pellet dispense is detected after a dispense request is received. A pellet dispense request signal is received by a processor in the housing, either by activation of the dispense button or input from another source, e.g., a lever in a cage. Upon receipt, a signal is sent from the processor to the motor to begin rotating. If the IR sensor does not detect a pellet, the disc will continue to be rotated until a pellet is detected or a given period of time passes. After the given period of time without detecting a pellet elapses, the system will go into a search mode, in which the disc is gently rotated back and forth from clockwise to counterclockwise to try and shake any remaining pellets into the pockets of the disc. If after a search mode time period elapses and further rotation no pellets are detected after as second rotation time period, the system will provide an indication, such as activating an indicator light and/or sending an alert to users, indicating the hopper is empty.

The dispensing process may additionally or alternatively include incrementing and decrementing the number of pellet requests and rotating the disc when the number of requests is greater than zero. Disc rotation may be correlated with steps of a step motor, and the number of steps can be correlated to the distance between holes on the disc. For the search mode, the motor can be moved clockwise a certain number of steps and counterclockwise a certain number of steps to attempt to load a pellet into a hole.

Figure 10:
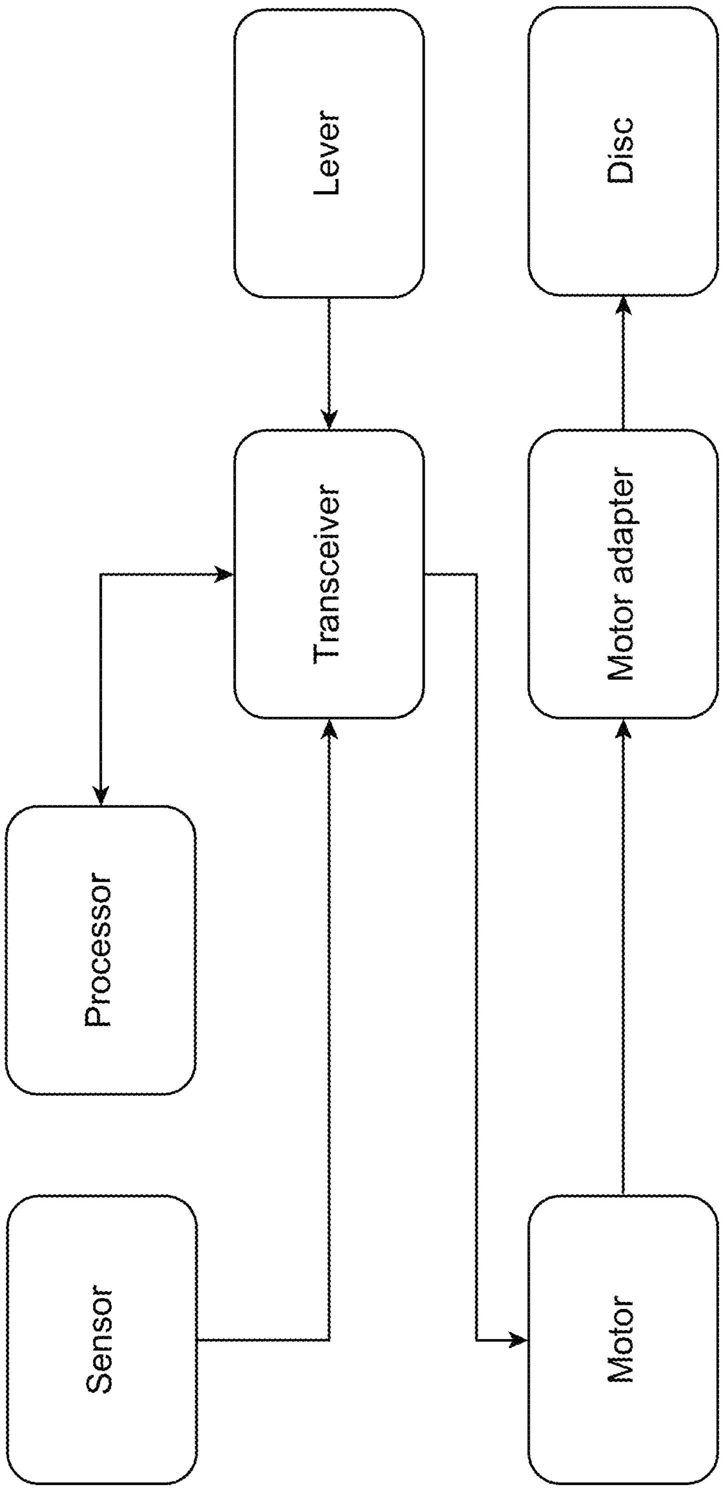
FIG. 10 is a schematic diagram of components for dispensing pellets.

FIG. 10 is a schematic diagram of components for operating the dispensing of pellets, including a processor, motor, sensor, motor adapter, and transceiver.

Cleaning of the pellet dispenser, which can be important for proper operation, is facilitated because the hopper preferably attaches to the bracket via magnets, allowing simple attachment and removal. Additionally, the hopper may be molded with two halves connected by a hinge and secured via a latch, allowing easy access internally for cleaning. To open the hopper, the latch on the front is released and the hopper may be opened up by pivoting around the hinge at the back of the hopper. The disc can also be easily removed.

The term "about" when used with a corresponding numeric value refers to ±20% of the numeric value, typically ±10% of the numeric value, often ±5% of the numeric value, and most often ±2% of the numeric value. In some embodiments, the term "about" can be taken as exactly indicating the actual numerical value.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A pellet dispenser system comprising:

a hopper having an upper chamber and a lower chamber, wherein the upper chamber is separated from the lower chamber by a divider, wherein the upper chamber includes an outer wall portion opposite the divider, wherein the lower chamber includes a pellet dispensing hole in an upper portion of a lower wall opposite the divider, and wherein the divider includes a passageway at a bottom of the divider;

a disc within the lower chamber having one or more pellet holes, wherein each of the one or more pellet holes is sized and configured to contain a food pellet and wherein each of the one or more pellet holes includes an indentation around the pellet hole in a surface of the disc;

a motor connected to the disc such that, upon activation, the motor rotates the disc such that a one of the one or more pellet holes rotates from a lower portion of the lower chamber to being aligned with the pellet dispensing hole;

a bracket, the bracket having a bracket mount, a pellet chute, and a housing, wherein the bracket is configured to receive the hopper and wherein a first end of the pellet chute is positioned to accept the food pellet from the pellet dispensing hole; and an IR sensor in the housing, the IR sensor configured to direct an IR beam through the pellet chute, wherein the hopper includes one or more magnet bosses beneath the lower chamber.

2. The pellet dispenser system of claim 1, wherein the motor is a stepper motor.

3. The pellet dispenser system of claim 2, further including a stepper motor adapter configured to operably connect the stepper motor to the disc, wherein the disc can be disconnected from the adapter by lifting the disc-without more.

4. The pellet dispenser system of claim 3, wherein the hopper can be removed from the bracket by lifting the hopper.

5. A pellet dispenser system comprising:

a hopper having an upper chamber and a lower chamber, wherein the upper chamber is separated from the lower chamber by a divider, wherein the upper chamber includes an outer wall portion opposite the divider, wherein the lower chamber includes a pellet dispensing hole in an upper portion of a lower wall opposite the divider, and wherein the divider includes a passageway at a bottom of the divider;

a disc within the lower chamber having one or more pellet holes, wherein each of the one or more pellet holes is sized and configured to contain a food pellet and wherein each of the one or more pellet holes includes an indentation around the pellet hole in a surface of the disc;

a motor connected to the disc such that, upon activation, the motor rotates the disc such that a one of the one or more pellet holes rotates from a lower portion of the lower chamber to being aligned with the pellet dispensing hole;

a bracket, the bracket having a bracket mount, a pellet chute, and a housing, wherein the bracket is configured to receive the hopper and wherein a first end of the pellet chute is positioned to accept the food pellet from the pellet dispensing hole; and an IR sensor in the housing, the IR sensor configured to direct an IR beam through the pellet chute, wherein the bracket is configured to support the hopper such that, when the bracket is mounted on a vertical surface, the outer wall portion is vertical and the lower wall is at about a 45 degree angle.

6. The pellet dispenser system of claim 5, wherein the disc includes a chamfered edge and a spacer, wherein the spacer is sized such that, when the disc is in the lower chamber and connected to the motor, the spacer extends toward the divider such that the disc remains flush against the lower wall.

7. The pellet dispenser system of claim 5, further including a hinge on an outer edge of the hopper, wherein the hopper includes two halves connected by the hinge.

8. The pellet dispenser system of claim 5, wherein the housing includes processor configured to:

receive a request for a pellet;

send a signal to the motor to rotate such that the disc rotates;

receive a signal from the IR sensor indicating that the IR beam has been interrupted;

send a signal to the motor to stop rotating when the signal from the IR sensor is received;

send, if the signal from the IR sensor is not received within a first time period, a signal to the motor to rotate back and forth for a second time period and then resend the signal to the motor to rotate; and send an alert if the signal from the IR sensor is not received within a third time period.

9. A feeder system for dispensing pellets comprising:

a hopper having an upper chamber and a lower chamber, wherein the upper chamber is separated from the lower chamber by a divider, wherein the upper chamber includes an outer wall portion, wherein the lower chamber includes a pellet dispensing hole in an upper portion of a lower wall opposite the divider, and wherein the divider includes a pellet passageway at a lower portion of the divider; and a bracket, the bracket having a bracket mount, a pellet chute, and a housing, wherein the pellet chute includes a first end positioned to accept a food pellet from the pellet dispensing hole, wherein the bracket is configured to support the hopper such that, when the bracket is mounted the outer wall portion is vertical and the lower wall is at about a 45 degree angle and wherein the divider is parallel to the lower wall and the hopper includes a plurality of magnet bosses on a bracket-facing end.

10. The feeder system of claim 9, where-in the housing includes a steel plate beneath a plurality of apertures positioned to align with the plurality of magnet bosses when the hopper is attached to the bracket.

* * * * *